United States Patent
Wallace et al.

(10) Patent No.: US 10,660,266 B2
(45) Date of Patent: May 26, 2020

(54) SYSTEM AND METHOD FOR MONITORING AN AGRICULTURAL BELT

(71) Applicant: ContiTech Transportbandsysteme GmbH, Hannover (DE)

(72) Inventors: Jack Wallace, Powell, OH (US); Douglas Gilg, Powell, OH (US); Alan Echtenkamp, Waverly, NE (US); Jacques Basson, Durban (ZA)

(73) Assignee: ContiTech Transportbandsysteme GmbH, Hannover (DE)

( * ) Notice: Subject to any disclaimer, the term of this patent is extended or adjusted under 35 U.S.C. 154(b) by 147 days.

(21) Appl. No.: 15/186,197

(22) Filed: Jun. 17, 2016

(65) Prior Publication Data
US 2017/0359953 A1 Dec. 21, 2017

Related U.S. Application Data

(60) Provisional application No. 62/331,087, filed on May 3, 2016.

(51) Int. Cl.
*A01D 34/00* (2006.01)
*A01D 34/40* (2006.01)
(Continued)

(52) U.S. Cl.
CPC .......... *A01D 34/008* (2013.01); *A01D 34/40* (2013.01); *A01D 41/14* (2013.01); *A01D 57/20* (2013.01);
(Continued)

(58) Field of Classification Search
CPC ...... A01D 34/008; A01D 34/40; A01D 57/20; A01D 2101/00; A01F 2015/078;
(Continued)

(56) References Cited

U.S. PATENT DOCUMENTS

| | | | | |
|---|---|---|---|---|
| 3,750,129 A * | 7/1973 | Takeno | .................. | B65G 43/02 198/810.02 |
| 4,020,945 A * | 5/1977 | Takeno | .................. | B65G 43/02 198/810.02 |

(Continued)

FOREIGN PATENT DOCUMENTS

| | | |
|---|---|---|
| DE | 102009003763 A1 | 10/2010 |
| EP | 2382854 A1 | 11/2011 |

OTHER PUBLICATIONS

International Search Report and Written Opinion dated May 16, 2017 of corresponding international application PCT/EP2017/057197.

*Primary Examiner* — Lee E Rodak
(74) *Attorney, Agent, or Firm* — Gregory Adams; David L. Cate

(57) ABSTRACT

A belt monitoring system for an agricultural belt arrangement, the monitoring system including an agricultural belt having a magnetic element embedded therein and a sensor. The agricultural belt arrangement defines a proper belt alignment for the belt and moves the belt. The magnetic element is polarized so as to output a magnetic signal. The sensor is configured to detect, at a reference position, the magnetic signal outputted by the magnetic element. The monitoring system further includes a circuit configured to output a signal if, for example, the agricultural belt moves more than a predetermined amount through the agricultural belt arrangement without the sensor arrangement detecting the magnetic signal outputted by the magnetic element, a predetermined amount of time passes without the sensor detecting the magnetic signal, and the circuit determines the position of the magnetic element to be outside of a permissible positional range.

8 Claims, 5 Drawing Sheets

(51) Int. Cl.
  *G01B 7/04* (2006.01)
  *A01D 57/20* (2006.01)
  *A01D 41/14* (2006.01)
  *A01D 101/00* (2006.01)

(52) U.S. Cl.
  CPC .......... *G01B 7/046* (2013.01); *A01D 2101/00* (2013.01)

(58) Field of Classification Search
  CPC ............ G01B 7/046; B65G 2203/0291; B65G 2203/0275; B65G 2203/044; B65G 43/02; B65G 43/00; B65G 43/06; B65G 15/36; B65G 15/30; B65G 15/34; B65G 15/42; B65G 15/64; B65G 2201/02; B65G 23/06; B65G 39/16; B65G 45/02; Y10T 428/24777; Y10T 428/24099; Y10T 428/24529; Y10T 428/24628; Y10T 428/24785; Y10T 442/322; Y10T 442/3228; Y10T 442/3301; Y10T 442/3561
  See application file for complete search history.

(56) References Cited

U.S. PATENT DOCUMENTS

| | | | |
|---|---|---|---|
| 4,316,536 A | 2/1982 | Verbeek | |
| 4,864,233 A * | 9/1989 | Harrison | G01N 27/82 324/227 |
| 5,096,044 A * | 3/1992 | Biebel | B65G 39/16 198/502.4 |
| 5,404,994 A | 4/1995 | Brandenberger | |
| 5,422,165 A | 6/1995 | Arnold | |
| 5,426,362 A * | 6/1995 | Ninnis | G01N 27/82 324/235 |
| 6,291,991 B1 | 9/2001 | Schnell | |
| 6,518,207 B1 | 2/2003 | Andresen et al. | |
| 6,789,735 B1 | 9/2004 | Schnell | |
| 7,543,428 B1 * | 6/2009 | Puryk | A01D 57/20 430/127 |
| 7,810,637 B2 | 10/2010 | Gundlach | |
| 8,074,789 B2 * | 12/2011 | May | B65G 43/02 198/502.1 |
| 2003/0045966 A1* | 3/2003 | Ubaldi | B65G 39/16 700/213 |
| 2010/0025198 A1* | 2/2010 | Wallace | B65G 15/36 198/810.02 |
| 2010/0131232 A1* | 5/2010 | Taylor | F02B 77/081 702/147 |
| 2010/0182001 A1* | 7/2010 | Furukawa | B65G 43/02 324/241 |
| 2015/0144459 A1 | 5/2015 | Wallace et al. | |
| 2015/0195993 A1* | 7/2015 | Hasenour | A01D 57/20 56/153 |

* cited by examiner

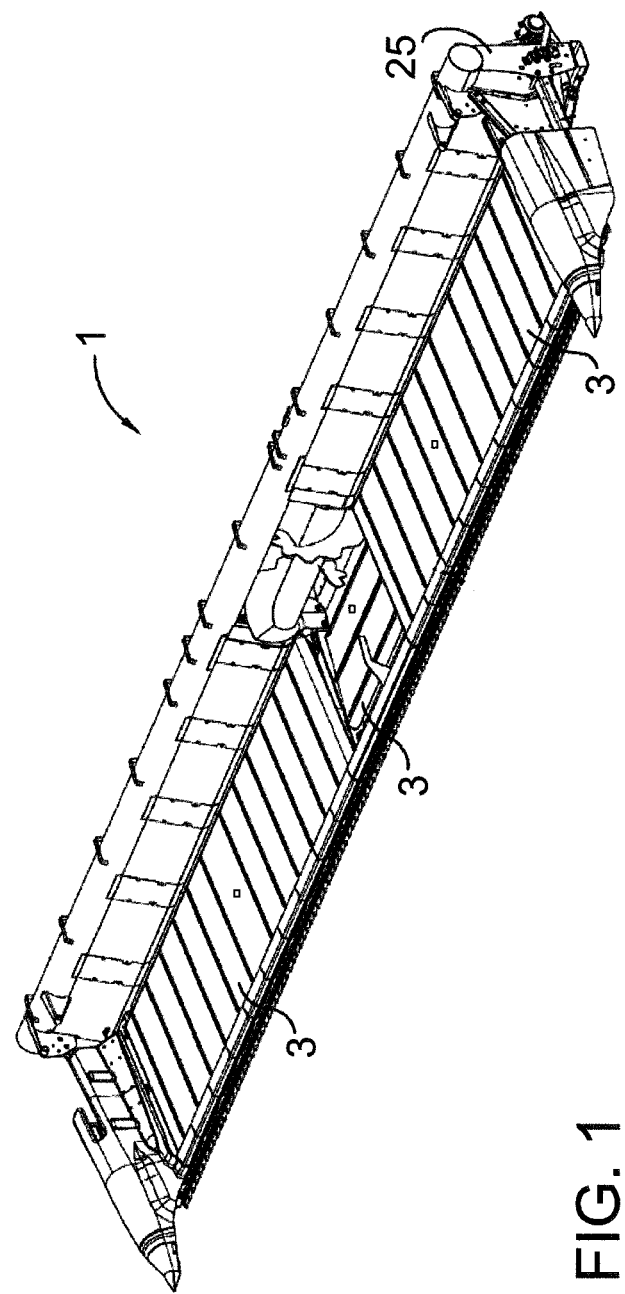

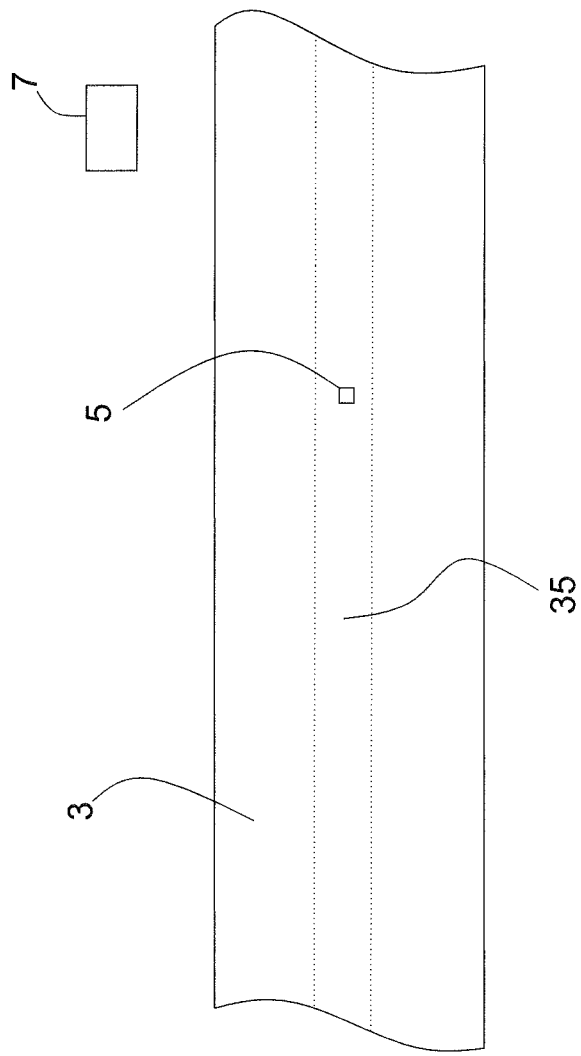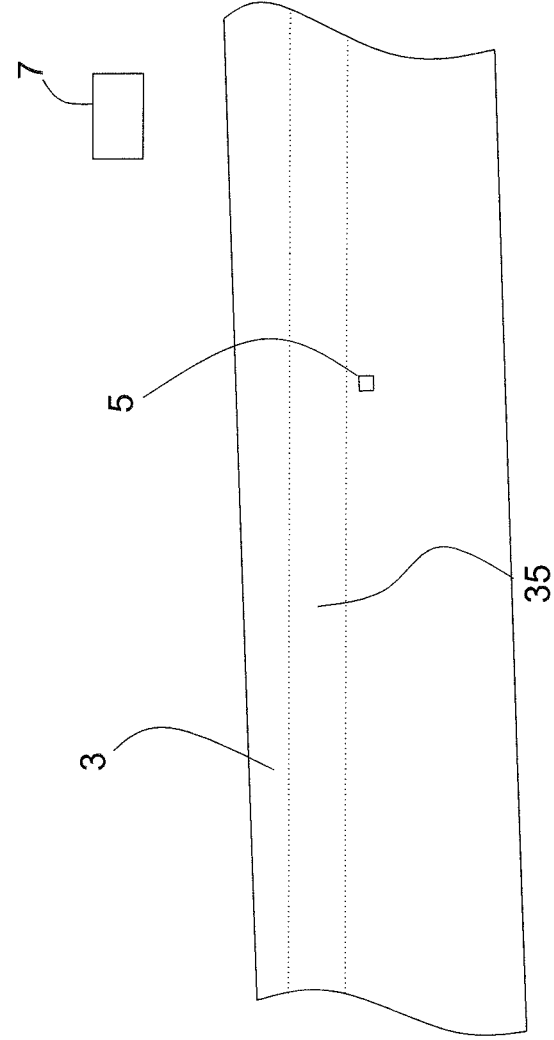

SYSTEM AND METHOD FOR MONITORING AN AGRICULTURAL BELT

FIELD OF THE INVENTION

The invention relates to agricultural belts. Such belts can, for example, be used in a draper header of a combine harvester and in other agricultural applications such as agricultural sorting arrangements.

BACKGROUND OF THE INVENTION

Draper belts on agricultural draper headers for combines process crops during harvesting. Draper belts are typically driven by a hydraulic motor which in turn is powered by the hydraulic system of the combine. If an excess of soil contaminates the header, the belt might become misaligned, de-tracked and slip out of the drive pulley. This can result in a damaged draper belt and potentially a damaged mechanical structure of the draper header which can lead to additional downtime during harvesting. The same issues can occur in other agricultural belt systems such as agricultural sorting arrangements.

U.S. Pat. No. 6,789,735 discloses a device for coding and marking objects and is incorporated herein by reference. The coding and marking system is embedded in the object and includes a plurality of detectable material particles. The detectable particles are arranged in a pattern representing a code. The detectable particles and thus the code are read by a scanner as the object moves past the scanner or a scanner moves past the object. The device for coding and marking objects disclosed in U.S. Pat. No. 6,789,735 is, in particular, for conveyor belts, conveyor belt connections, and tubular bodies such as hoses.

SUMMARY OF THE INVENTION

It is an object of the invention to provide a system for monitoring the position of a belt and determining whether the belt has mis-tracked.

The object can, for example, be achieved by an agricultural belt monitoring system for an agricultural belt arrangement, the monitoring system including an agricultural belt having a magnetic element embedded therein. The system further includes a sensor arrangement including at least one sensor. The agricultural belt arrangement defines a proper belt alignment for the agricultural belt and can drive the agricultural belt through the agricultural belt arrangement. The magnetic element is configured to a magnetic signal. The sensor arrangement is configured to detect, at a reference position in the agricultural belt arrangement, the magnetic signal outputted by the magnetic element when the agricultural belt is in the proper belt alignment as the agricultural belt moves through the agricultural belt system. A circuit is configured to output a signal if at least one of: the agricultural belt moves more than a predetermined amount through the agricultural belt arrangement without the sensor detecting the magnetic signal outputted by the magnetic element, and, a predetermined amount of time passes without the sensor detecting the magnetic signal outputted by the magnetic element when the agricultural belt is moving through the agricultural belt arrangement.

The magnetic elements can be permanent magnets or include a material capable of being magnetized such as a ferromagnetic material. If a material capable of being magnetized is used instead of a permanent magnet, a field generator can be used to magnetize the magnetic elements prior to them being read by the scanner.

The object is also achieved by an agricultural belt monitoring system for an agricultural belt system defining a lateral and a longitudinal direction, wherein the monitoring system includes an agricultural belt having at least one magnetic element embedded therein. The monitoring system further includes a sensor arrangement having at least one sensor. The agricultural belt system is configured to move the agricultural belt through the agricultural belt arrangement in the longitudinal direction. The magnetic element is configured to output a magnetic signal. The sensor arrangement is configured to detect, at a reference position in the agricultural belt arrangement, the magnetic signal outputted by the magnetic element as the agricultural belt moves through the agricultural belt arrangement. The system further includes a circuit configured to determine a position of the magnetic element with respect to the lateral direction on the basis of the magnetic signal detected by the sensor arrangement. The circuit is further configured to compare the position of the magnetic element determined by the circuit to a permissible positional range with respect to the lateral direction. When the position of the magnetic element determined by the circuit is outside of the permissible positional range, the circuit is configured to output a signal.

According to another embodiment, the signal outputted by the circuit can be used by the drive of the agricultural belt arrangement to control and correct the alignment of the agricultural belt in the agricultural belt arrangement.

It is a further object of the invention to provide a method for monitoring the position of an agricultural belt in a belt system.

The object can, for example, be achieved by a method for monitoring an agricultural belt having a magnetic element embedded therein. The agricultural belt is configured to move through an agricultural belt system defining a lateral direction. The method including the steps of: detecting a magnetic signal of the magnetic element embedded in the agricultural belt; determining a position of the magnetic element with respect to the lateral direction; comparing the determined position of the magnetic element to a permissible positional range; and, outputting a signal when the determined position of the magnetic element is outside the permissible positional range.

The object can further be achieved by a method for monitoring an agricultural belt in an agricultural belt arrangement with an agricultural belt monitoring system, the agricultural belt having a magnetic element configured to output a magnetic signal embedded therein, the agricultural belt arrangement being configured to move the agricultural belt through the agricultural belt arrangement and defining a proper agricultural belt alignment, the magnetic element being arranged in the agricultural belt such that the magnetic element passes through an area scanned by a sensor arrangement configured to detect the magnetic signal, the method comprising the steps of: scanning at least a longitudinal subsection of the agricultural belt for the magnetic signal outputted by the magnetic element as the agricultural belt moves through the agricultural belt arrangement with the sensor arrangement; outputting a signal when at least one of: the agricultural belt moves more than a predetermined amount through the agricultural belt arrangement without the sensor detecting the magnetic signal outputted by the magnetic element, and, a predetermined amount of time passes without the sensor detecting the magnetic signal outputted by the magnetic element when the agricultural belt is moving through the agricultural belt arrangement.

Unlike the conveyor belt based technology application or other embodiments which look at entire belt width, the monitoring system, here, focuses on the magnetic signal emitted by a magnetic element embedded in the belt. The magnetic element can be a permanent magnet or include a material capable of being magnetized, for example, a ferromagnetic material. An example of the magnetic element is the end of an embedded wire or cord and the monitoring system monitors the position of the end of the wire end to determine whether the belt is still tracking properly. The position of the magnetic element is determined via a sensor. The sensor can be a sensor array having a fixed position. Examples of possible sensors include Hall Effect sensors, magnetic field detecting coils and any sensors configured to interact with magnetic fields to generate a sensor response proportional to the field strength. Additional functionality of the belt monitoring system includes that the system can be used as an independent speed indicator as the embedded wire could be monitored over time to determine the speed at which the belt is moving through the belt arrangement. The belt monitoring system can also be used to determine whether belt slip has occurred, that is the belt, for example, slipped on the pulley resulting in the belt not moving as much and/or fast through the agricultural belt arrangement as indicated by a sensor, for example, measuring the speed at which the pulley is moving. Further, the belt arrangement can be used to actively control the drive mechanism on the harvester so as to correct the belt tracking.

BRIEF DESCRIPTION OF THE DRAWINGS

The invention will now be described with reference to the drawings wherein:

FIG. 1 shows an agricultural belt arrangement in the exemplary form of a draper header for a combine harvester;

FIG. 5A shows a further embodiment of the belt monitoring system monitoring the top surface of an agricultural belt; and, FIG. 5B shows the embodiment of FIG. 5A wherein the agricultural belt is misaligned.

DESCRIPTION OF THE PREFERRED EMBODIMENTS OF THE INVENTION

Figure 2A:
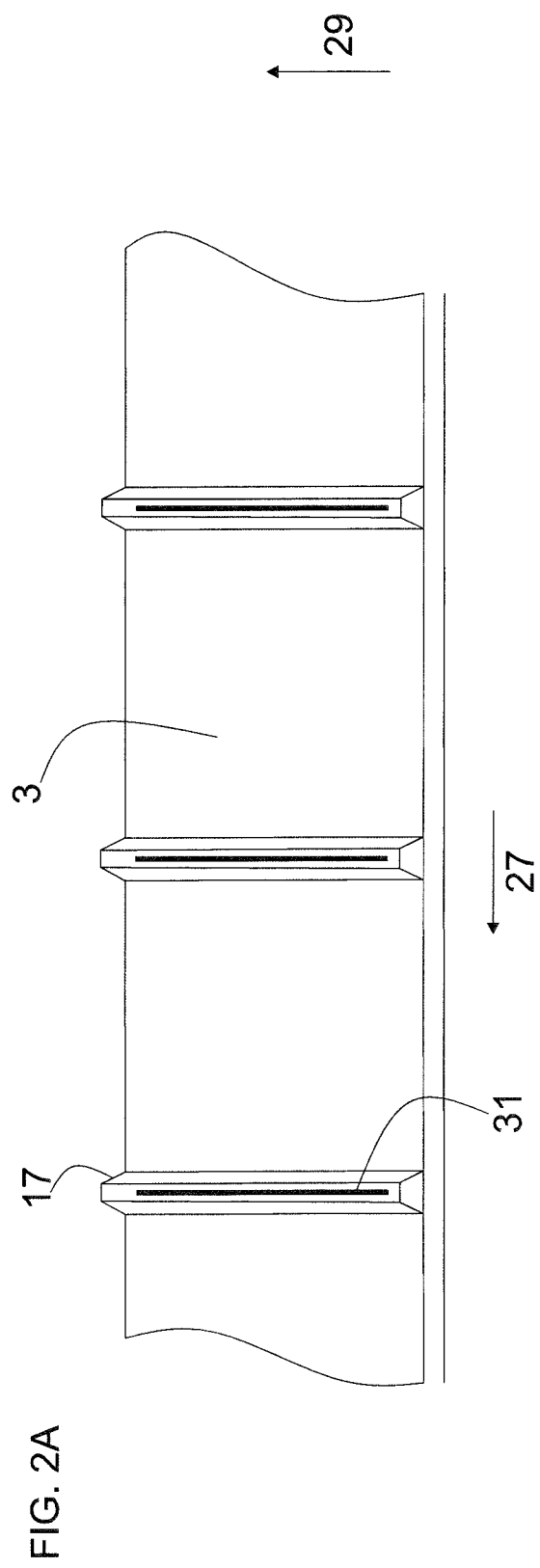
FIG. 2A shows the top surface of an agricultural belt having transverse protrusions configured as cleats.

FIG. 1 shows an agricultural belt arrangement. In the example of FIG. 1, the agricultural belt arrangement 1 is a draper header of a combine harvester. In the shown example, the agricultural belt arrangement 1 includes three agricultural belts 3. Each of the belts 3 can be separately monitored with the monitoring system described herein. The agricultural belts 3 shown in FIG. 1 include a belt carcass and a plurality of transverse protrusions 17, here configured as cleats, extending up from the belt carcass. The belt carcass defines a longitudinal belt direction. The cleats are arranged transverse to the longitudinal belt direction. The belts can also have one or more v-guides (See FIG. 2B). The v-guide 15 aids the agricultural belt arrangement 1 in guiding the belt 3 through the belt arrangement 1 and extends in the longitudinal belt direction. The agricultural belt arrangement 1 includes a frame 25 and defines the alignment of the agricultural belt 3 and the course thereof. The agricultural belt arrangement 1 can, for example, also be part of an agricultural sorting facility or other agricultural application.

Magnetic elements 5 are embedded in the belt to facilitate the monitoring of the agricultural belt 3. The magnetic elements 5 can be embedded directly in the belt carcass or in a belt structure projecting from the belt carcass, such as in a v-guide 15 or a transverse element like a cleat. The magnetic elements 5 can include permanent magnets or a material capable of being magnetized, such as a ferromagnetic material. Where the magnetic elements 5 do not include a permanent magnet but rather a material capable of being magnetized, the magnetic elements 5 are magnetized via, for example, a field generator 13 so as to enable the sensor arrangement 7 to detect a magnetic signal outputted by the magnetic elements 5. The magnetic element 5 is magnetically polarized or can be magnetically polarized prior to passes the sensor so that the magnetic element outputs a magnetic signal. The magnetic signal outputted by the magnetic element 5 can be a unique magnetic signal. If the system is used in an application or environment where other magnetic signals are generated, the sensor arrangement 7 can be configured to detect the unique magnetic signal of the magnetic element 5. Further, where a plurality of magnetic elements 5 are embedded in the belt, each magnetic element 5 can output a unique signal so as to, for example, enable the circuit 11 to determine the identity of the magnetic element 5 detected by the sensor arrangement 7. The circuit 11 can be an analog or digital circuit. Further the circuit can, for example, be in the form of a microprocessor, microcontroller, a central processing unit of a computer and the like.

FIG. 2A shows the top portion of an agricultural belt 3 having transverse protrusions 17 extending up from the main body of the agricultural belt 3. The transverse protrusions 17, here, are embodied as cleats. The transverse protrusions 17 may, however, have different configurations, such as a chevron pattern, diamond top, rough top or other patterns. In the example embodiment shown in FIG. 2, wires 31 are embedded in the individual cleats. Magnetic elements 5 of other configurations can also be embedded in the transverse protrusions 17. One or both ends of the wire 31 can be used as the magnetic elements 5. If, for example, the wire 31 is made of a ferromagnetic material, the field generator 13 can magnetize the wire 31 so as to enable the sensor arrangement 7 to detect the ends thereof, whereby one end may have the opposite polarity of the other end of the wire 31. The field generator 13 can, for example, be a permanent magnet. Accuracy of the monitoring of the tracking of the agricultural belt 3 can be improved where the sensor arrangement 7 is configured to detect both ends of the wire 31. Where both sides of the wire are detected and the position of each is monitored, the system can provide redundancy, thus improving the reliability and accuracy of the system. Each end of the wire may have an opposite polarity, thus one end would be north and the opposing end would be south. A single sensor 8 may detect both ends of the wire 31 or a separate sensor 8 can be allocated to each end of the wire 31. Other configurations could of course also be used, for example, a washer could be used as the magnetic element which could then be subject to radial magnetization. The agricultural belt 3 moves through the agricultural belt arrangement in a longitudinal direction 27 (the longitudinal direction can also refer to the opposite direction of the arrow shown in FIG. 2A).

Figure 2B:
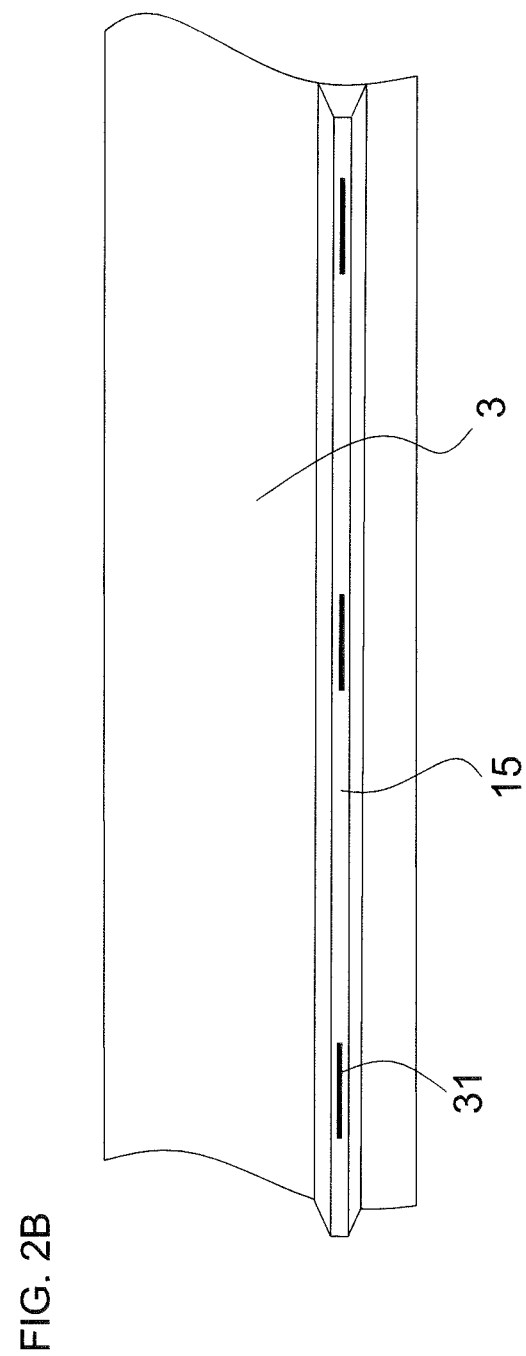
FIG. 2B shows the bottom surface of an agricultural belt having a v-guide.

FIG. 2B shows the bottom portion of an agricultural belt having a v-guide 15. The v-guide 15 can interact with the pulley 23 or another feature of the agricultural belt arrangement 1 so as to improve the guiding of the agricultural belt through the arrangement 1. The magnetic elements 5 in the example shown in FIG. 2B can be either or both ends of wires 31. A single wire 31 may be embedded in the v-guide or a plurality thereof. Where a plurality of wires 31 are embedded in the v-guide, they can also be spaced equally from each other or in a pattern.

Figure 3:
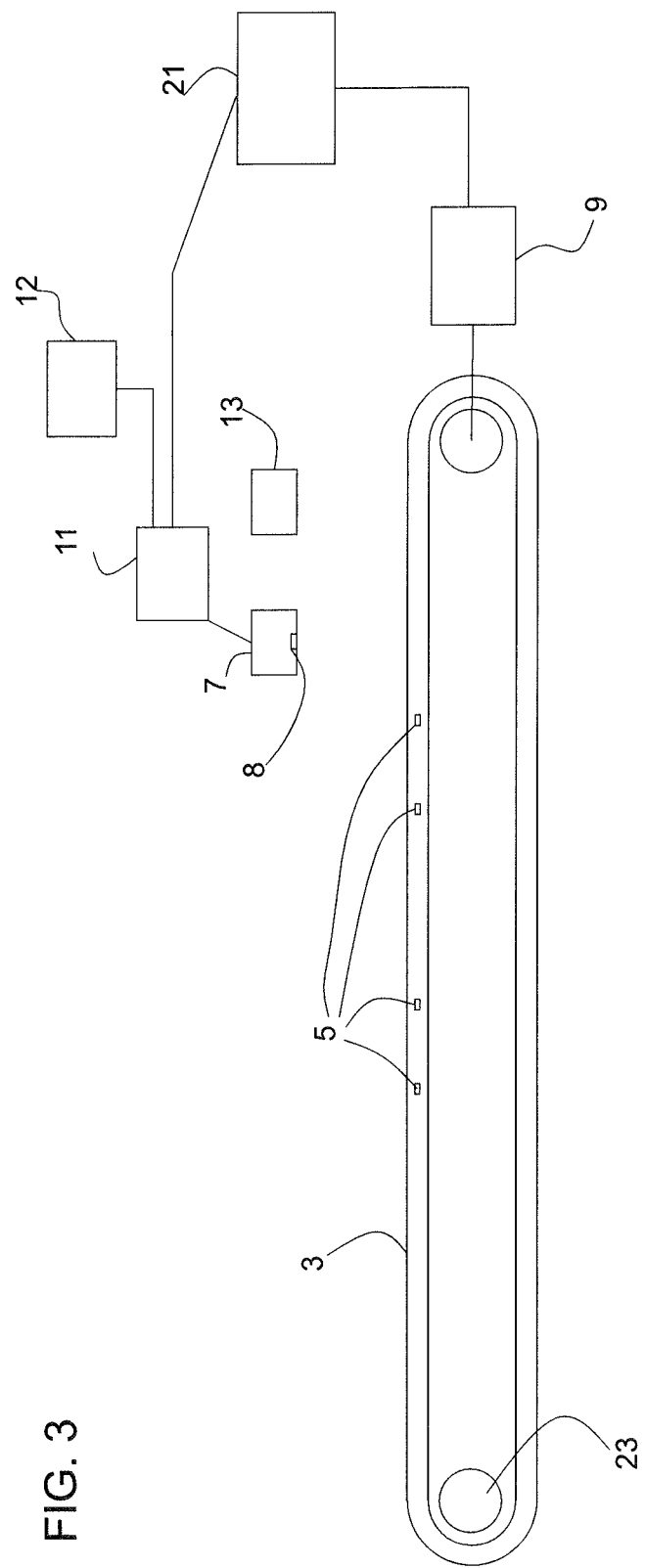
FIG. 3 shows an embodiment of the belt monitoring system.

FIG. 3 shows an embodiment of the agricultural belt monitoring system for an agricultural belt arrangement including a drive 9 and a pulley 23. An agricultural belt 3 is driven through an agricultural belt arrangement via the drive 9 and the pulley 23. The agricultural belt arrangement guides the agricultural belt and defines a proper belt alignment. The agricultural belt arrangement can also include a controller 21 for controlling the drive 9. The agricultural belt monitoring system includes an agricultural belt 3 having magnetic elements 5 embedded therein, though a single magnetic element 5 can suffice. The magnetic elements 5 can be permanent magnets or include a material capable of being magnetized such as a ferromagnetic material. Where non-magnetic elements are embedded the monitoring system can include a field generator 13 for magnetizing the magnetic elements 5 so as to enable their detection by the sensor arrangement 7. The sensor arrangement 7 is disposed at a reference position. The sensor arrangement 7 includes at least one sensor 8 and can be configured as a sensor array including a plurality of sensors. The sensor arrangement 7 can include an electromagnetic sensor. If permanent magnets are used for the magnetic elements 5, the sensor arrangement can use a variety of magnet-sensitive methods to detect the magnetic element 5, for example magnetic inductive methods, magnetoresistive sensors or sensors based on the Hall Effect. The sensor arrangement is operatively connected to a circuit 11. The belt monitoring system can also include a data storage unit 12, which can store a pattern describing how a plurality of magnetic elements 5 are distributed over the agricultural belt 3.

Figure 4:
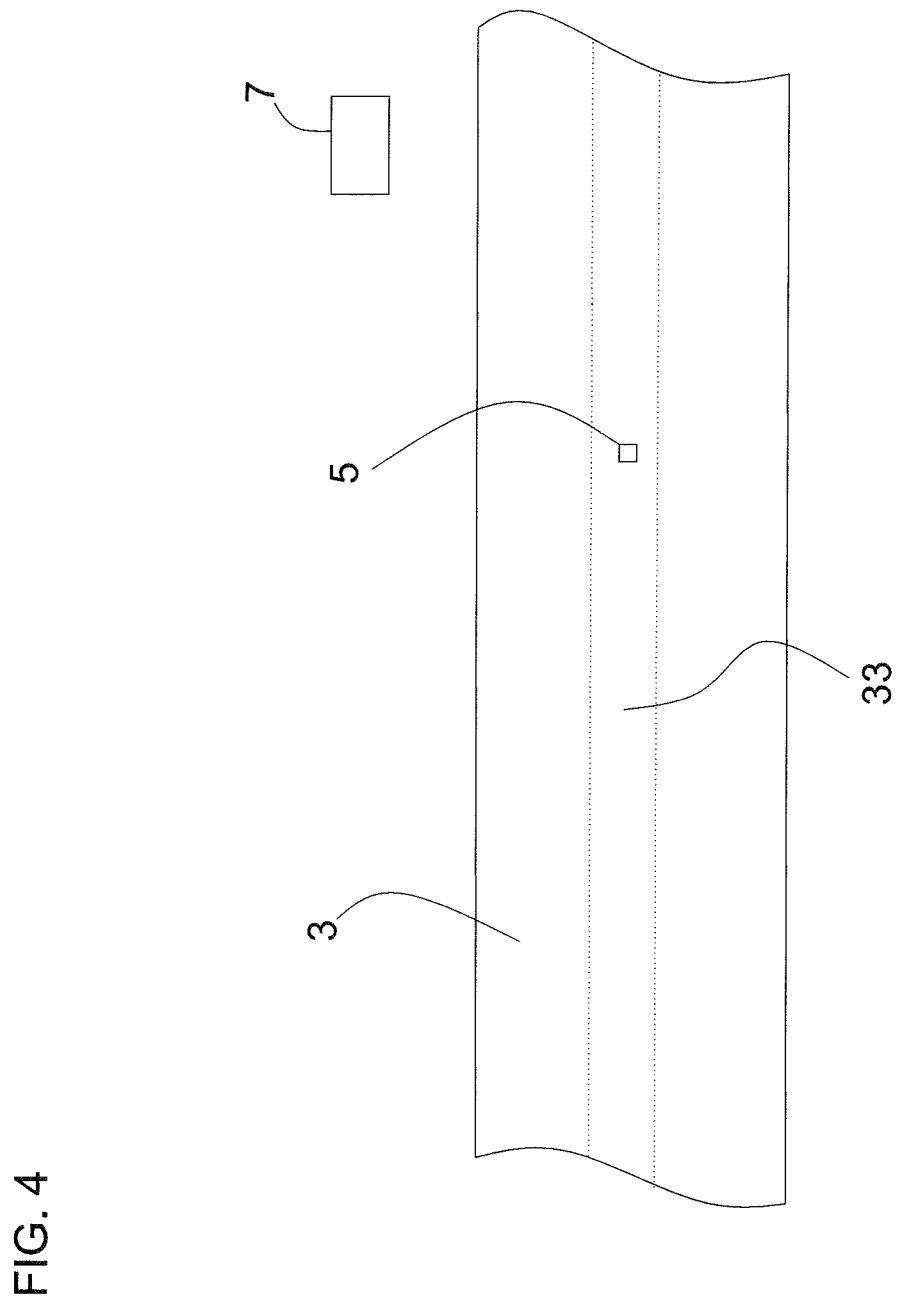
FIG. 4 shows an embodiment of the belt monitoring system monitoring the top surface of an agricultural belt.

According to an embodiment, the sensor arrangement 7 is configured to scan a longitudinal subsection 33 of the agricultural belt 3 as shown in FIG. 4. When the agricultural belt 3 is in proper alignment in the agricultural belt arrangement 1, the magnetic element 5 is within the longitudinal subsection 33 as the agricultural belt 3 moves through the agricultural belt arrangement 1 and is detected by the sensor arrangement 7 as it passes the same. If the agricultural belt 3 becomes misaligned and thus the magnetic element 5 is no longer in the longitudinal subsection 33 scanned by the sensor arrangement 7, the sensor arrangement 7 can no longer detect the magnetic element 5.

The circuit 11 can measure the time between subsequent detections of the magnetic element 5 and can receive input data regarding the speed at which the agricultural belt 3 is moving from the agricultural belt arrangement. The circuit 11 may also receive average speed data from the agricultural belt arrangement 1, especially if monitoring is to occur while the belt 3 is accelerating or slowing down. If the circuit 11 determines that the sensor arrangement 7 has not detected the magnetic element for a predetermined amount of time, the circuit 11 outputs a signal. The signal can be used to alarm a user of the agricultural belt arrangement 1, stop the belt 3, or as an input to the agricultural belt arrangement to control the belt alignment. Where the speed of the belt 3 is variable, the predetermined amount of time may also be made dependent on the speed of the belt 3.

In embodiments in which the speed of the belt is known, for example from a sensor or drive 9 of the agricultural belt arrangement 1, or is calculated by the circuit 11, a time target can be linked to the belt speed and historic belt properties. The historic belt properties of the agricultural belt 3 can be stored in the data storage unit 12. In an embodiment with a single magnetic element 5 embedded in the belt, for example, if the belt has a known length of five meters and the agricultural belt 3 is moving at a speed of 2 meters per second (m/s), the belt monitoring system should expect to detect the magnetic element 5 every 2.5 seconds. The locations of the magnetic elements 5 can also be stored on the data storage unit 12, especially if the magnetic elements 5 are arranged in a pattern or are distributed in an uneven manner over the length of the belt.

Alternatively or additionally the circuit 11 can receive information regarding the amount the belt 3 has moved from the agricultural belt arrangement 1 and output a signal when the agricultural belt 3 has moved more than a predetermined amount without the sensor arrangement 7 detecting a magnetic element 5.

A plurality of magnetic elements 5 can also be embedded in the belt 3 at a known spaced relationship to each other and if the time or distance traveled between detections of subsequent ones of the magnetic elements 5 is greater than a predetermined amount, the circuit 11 outputs a signal. Where the magnetic elements 5 are distributed over the length of the belt in a pattern, the pattern may be stored on a data storage unit 12. The circuit 11 can then access the pattern stored on the data storage unit 12 so as to determine the amount of time or amount of movement before the sensor arrangement 7 is expected to detect the next magnetic element 5.

The pattern can represent a code which can be read by the sensor arrangement and evaluated by the circuit. The arrangement of the magnetic elements in a pattern representing a code enables a user or a system to determine the unique identity of the belt which can be linked to date of manufacture, specific quality and production records, etc.

The circuit can also be configured to include a counter which tracks the number of revolutions of the agricultural belt as it moves through the agricultural belt arrangement. The agricultural belt monitoring system could through the inclusion of a counter provide an indication as to the service life of the agricultural belt.

According to another embodiment, the circuit 11 is configured to determine a position of the magnetic element 5 with respect to a lateral direction 29 as defined by the agricultural belt arrangement 1. The sensor arrangement 7 may scan the entire width of the agricultural belt 3 or a subsection thereof. FIG. 5A shows the agricultural belt 3 in a proper alignment in the agricultural belt arrangement 1 with the magnetic element 5 disposed within a permissible positional range 35. When the magnetic element 5 is detected by the sensor arrangement 7, the circuit 11 determines the position of the magnetic element with respect to the lateral direction and compares the determined position to the permissible positional range 35. In the event the belt 3 becomes misaligned as shown in FIG. 5B and the circuit 11 determines that the position of the magnetic element 5 as detected by the sensor arrangement 7 is outside of the permissible positional range 35, the circuit 11 outputs a signal. The circuit 11 can also output a signal when no magnetic element is detected for a predetermined amount of time or the belt 3 has traveled more than a predetermined amount without a magnetic element 5 having been detected by the sensor arrangement 7. The signal outputted by the circuit 11 can, for example, be used to alert an operator, stop the belt or to correct the belt alignment. Where the signal is used to correct the belt alignment, the signal can, for instance, include positional information of the magnetic element 5 and/or control instructions for the drive so as to realign the belt such that the belt returns to the proper alignment and, thus, the magnetic element 5 returns to the permissible positional range 35.

According to a further embodiment, the circuit 11 can also be configured to determine the speed of the belt. Thus, the belt monitoring system can function as a secondary speed indicator. Where the belt 3 includes a single magnetic element 5, the speed of the belt 3 can, for example, be computed by the circuit 11 on the basis of the time period between sequential detections of the magnetic element 5 by the sensor arrangement 7 and the length of the belt 3. Where the agricultural belt 3 is accelerating or decelerating, the circuit 11 can determine an average speed over the last revolution of the belt 3. The agricultural belt 3 can also include a plurality of magnetic elements arranged at a known spaced relationship to each other. The circuit 11 can compute the speed of the belt 3 by measuring the time period between detection of the individual magnetic elements 5. If the magnetic elements 5 are arranged in a pattern, the pattern can be stored on the data storage unit 12 and be read by the circuit for calculating the speed. Along with the positional data of the magnetic elements, the permissible positional range can also be stored on the data storage unit 12.

In embodiments in which the agricultural belt monitoring system determines the speed of the belt 3, the speed determined by the system can be compared to an independent speed sensor which may be part of the agricultural belt arrangement 1. Through the comparison of the speed determined by the monitoring system and the speed determined by the independent speed and the differential therebetween, the circuit can also determine whether belt slip has occurred.

An RFID tag or more can also be embedded in the belt for determining the belt position. The agricultural belt monitoring system would then include an RFID tag reader arranged at a reference position and configured to read the RFID tags. The circuit 11 can then determine the position of the belt 3 on the basis of RFID tag detection. Information regarding the RFID tag position can also be stored on the data storage unit 12.

It is understood that the foregoing description is that of the preferred embodiments of the invention and that various changes and modifications may be made thereto without departing from the spirit and scope of the invention as defined in the appended claims.

REFERENCE NUMERALS

1 Agricultural belt arrangement
2 Agricultural belt
5 Magnetic element
7 Sensor arrangement
  8 Sensor
9 Drive
11 Circuit
12 Data storage unit
13 Field generator
15 v-guide
17 Transverse protrusion
21 Agricultural belt arrangement controller
23 Pulley
25 Frame of the agricultural belt arrangement
  27 Longitudinal direction
29 Lateral direction
31 Wire
33 Longitudinal subsection of the agricultural belt
35 Permissible positional range

What is claimed is:

1. An agricultural belt monitoring system for an agricultural belt arrangement, the monitoring system comprising:
    an agricultural belt having a magnetizable element embedded therein made of ferromagnetic material, wherein the magnetizable element comprises a plurality of magnetic elements embedded within the agricultural belt;
    wherein the plurality of magnetic elements are located along a longitudinal subsection of the agricultural belt according to a selected spacing, wherein the spacing forms a unique code and wherein the longitudinal subsection is spaced a selected distance from an edge of the belt;
    a sensor arrangement including a plurality of sensors;
    the agricultural belt arrangement defining a proper belt alignment for said agricultural belt and being configured to move said agricultural belt through the agricultural belt arrangement;
    said magnetizable element being configured to output a magnetic signal after being magnetized;
    said sensor arrangement being configured to detect, at a reference position in the agricultural belt arrangement, said magnetic signal outputted by said magnetizable element when said agricultural belt is in said proper belt alignment as said agricultural belt moves through the agricultural belt arrangement and to read the code to determine a unique identity of the belt;
    a circuit configured to output a signal if at least one of:
        (a) said agricultural belt moves more than a predetermined amount through the agricultural belt arrangement without the sensor monitoring system detecting said magnetic signal outputted by said magnetizable element; and,
        (b) a predetermined amount of time passes without the sensor monitoring system detecting said magnetic signal outputted by said magnetizable element when said agricultural belt is moving through the agricultural belt arrangement;
    a field generator arranged in spaced relationship to said agricultural belt; and,
    said field generator being configured to magnetize said ferromagnetic material of said magnetizable element in advance of being read by said sensor so as to cause said magnetizable element to generate the magnetic signal detectable by said sensor arrangement.

2. The agricultural belt monitoring system of claim 1, wherein:
    said agricultural belt has a length and defines a longitudinal belt direction;
    said agricultural belt includes an elevation configured as a v-guide running in said longitudinal belt direction; and,
    said magnetizable element is embedded in said v-guide.

3. The agricultural belt monitoring system of claim 1, wherein:
    the plurality of magnetic elements are disposed sequentially at a spaced relationship to each other.

4. The agricultural belt monitoring system of claim 3, wherein:
    said spaced relationship is a known spaced relationship;
    said sensor is configured to sequentially detect the plurality of magnetic elements; and, said circuit is further configured to determine the speed of said agricultural belt by the amount of magnetizable elements detected in a predetermined time window.

5. The agricultural belt monitoring system of claim 1, wherein:

said agricultural belt includes a plurality of transverse belt protrusions; and, the plurality of magnetic elements are embedded in said transverse belt protrusions.

6. The agricultural belt monitoring system of claim 1, wherein the agricultural belt is a draper belt.

7. The agricultural belt system of claim 1, wherein:

said sensor arrangement is configured to sequentially detect the plurality of magnetic elements; and, said circuit is further configured to determine the speed of said agricultural belt by measuring at least one of:

a time period between which said sensor detects respective ones of said magnetizable elements so as to determine the speed of said agricultural belt; and, the amount of magnetizable elements detected in a predetermined time window.

8. The agricultural belt monitoring system of claim 7, wherein:

the agricultural belt arrangement has a speed sensor configured to output a speed signal including a measured speed of said agricultural belt;

said circuit has a speed input configured to receive the speed signal;

said circuit is configured to determine a speed differential between said measured speed and the speed of said agricultural belt as determined by said circuit; and, said circuit is further configured to output a belt slip signal when said speed differential is greater than a predetermined amount.

* * * * *